Patented Oct. 31, 1950

2,527,889

UNITED STATES PATENT OFFICE

2,527,889

DIESEL ENGINE FUEL

Charles C. Moore, Palos Verdes Estates, and Paul W. Fischer, Long Beach, Calif., assignors to Union Oil Company of California, Los Angeles, Calif., a corporation of California No Drawing. Application August 19, 1946, Serial No. 691,664

9 Claims. (Cl. 44—66)

This invention relates to mineral oil fractions containing materials adopted to impart corrosion resisting characteristics to said fractions. The invention relates more particularly to mineral oil fractions containing the mentioned anti-corrosion agents, which oil fractions have use as lubricants and/or fuels and which in service may be contaminated or admixed with water or salt water, such as steam condensate, sea water, and the like. The invention is particularly applicable to turbine lubricating oils wherein the anti-corrosion agents protect the metal parts of the turbines from the effects of water which is characteristically present. Such oils must possess not only good lubricating properties but also good anti-corrosion properties and good non-emulsifying and de-emulsifying characteristics.

Moreover, the invention is applicable to internal combustion engine fuels, such as particularly, Diesel engine fuel which in many instances is contaminated with sea water particularly in marine Diesel engine service. In this connection it has been found that the presence of small amounts of sea water, such as 0.5% to 2.0% in Diesel engine fuel, causes severe corrosion of the injector parts of Diesel engines. This corrosion manifests itself in the breakage of check valve springs, corrosion of ground surfaces and other closely matching metal surfaces and results in early failure of the engine.

The invention is not limited to the mentioned turbine oils and Diesel fuels but applies as well to other mineral oil compositions which may contain water or become contaminated with water, such as various lubricating oils and greases, cutting oils, soluble-oils, marine lubricants, rust inhibitors, wetting agents, extreme pressure oils, and the like. Thus the addition agents described herein may be incorporated in substantially any mineral oil fraction or in any composition containing mineral oil or mineral oil fractions to impart to such compositions anti-corrosion and non-emulsifying characterstiics.

The principal object of the invention, therefore, is to provide mineral oil compositions which will possess the necessary anti-corrosion characteristics to prevent corrosion of metal parts with which the compositions have contact during use and it is a further object to produce such anti-corrosion compositions which will possess desirable non-emulsifying and de-emulsifying characteristics. A more particular object is to provide turbine oils which will meet the specifications of the Bureau of Ships as to both anti-corrosion characteristics and emulsion requirements. A further object of the invention is to provide Diesel engine fuels which, although contaminated with sea water, will not cause corrosion of engine parts particularly of the fuel injector parts of such engines.

Briefly, the invention resides principally in an appropriate petroleum fraction containing as anti-corrosion agents relatively small amounts of oil-soluble esters of polyhydroxy alcohols in which the amounts of addition agents are sufficient to impart the desired anti-corrosion properties. Preferably the composition will contain also small amounts of an oil-soluble monocarboxylic· organic acid. The inclusion in the composition of a monocarboxylic organic acid appears to be particularly desirable in those instances in which the composition comes in contact with, or may be contaminated by saline water, such as sea water.

The primary anti-corrosion additive, which will be referred to as a polyhydroxy alcohol ester, is preferably a monoester of a polyhydroxy alcohol although di- and tri-esters may be employed providing at least one hydroxyl (OH) group of the polyhydroxy alcohol is uncombined. Thus in the case of trihydroxy alcohols desirable esters will include the mono- and diesters, whereas, in the case of dihydroxy alcohols or those alcohols containing but two hydroxyl groups it is essential that the ester be a monoester. Polyhydroxy alcohols which may be used in the preparation of the desired esters include ethylene glycol, diethylene glycol, triethylene glycol, propylene glycol, dipropylene glycol and tripropylene glycol, the butylene glycols, alpha and beta, and the corresponding di- and tributylene glycols, glycerine, and the like.

The acid residues of the polyhydroxy alcohol esters include the residues of substantially any monocarboxylic organic acid having sufficient oil-solubility to impart oil-solubility to the resulting esters. In general, the organic acids will contain at least about 10 carbon atoms per molecule and preferably 12 or more carbon atoms per molecule. Such acids include fatty acids, such as capric, lauric, myristic, palmetic and stearic; unsaturated fatty acids, such as hypogeic acid, oleic acid, linoleic acid; mixtures of fatty acids such as those obtainable by saponifying natural fats and fatty oils and acidifying the resulting soaps, such as cocoanut oil fatty acids, lard oil fatty acids, tallow fatty acids, degras fatty acids, and the like; substituted fatty acids and unsaturated fatty acids, such as sulfurized oleic acid, halogenated fatty acids, for example, dichlorostearic acid, fatty acids substituted by various hydrocarbon radicals, such as phenyl stearic acid, and the like;

naphthenic acids, which are those oil-soluble carboxylic acids recoverable from naphthenic petroleum fractions by extraction with caustic soda and which are generally considered to be monocarboxylic acids containing at least one naphthene ring in the hydrocarbon portion of the molecule; oil-soluble acids produced by the oxidation of petroleum fractions such as by the liquid phase oxidation of kerosene and higher boiling fractions of mineral oil, particularly lubricating oil fractions and paraffin wax fractions of petroleum, rosin acids; tall oil acids, and the like.

Typical esters which have been found to be particularly desirable as anti-corrosion agents for use in our composition include glycerol monooleate, glycerol monolaurate, glycerol monoester of naphthenic acids obtained from Diesel fuel fractions of petroleum and having an average molecular weight of approximately 400; ethylene glycol monooleate, ethylene glycol monolaurate, ethylene glycol monoester of cocoanut oil fatty acids, diethylene glycol monooleate, diethylene glycol monolaurate, and the like.

The secondary additive which is desirably used in conjunction with the above described esters, particularly in the preparation of compositions apt to be contaminated by sea water, include all of the types of acids described in connection with the above mentioned esters. These acids will be oil-soluble monocarboxylic organic acids having 10 or more, and preferably 12 or more carbon atoms per molecule.

By the term oil-soluble as employed herein it is meant that the compounds are miscible or dispersible in the oils in the proportions which are employed. Thus it is not essential that the resulting solutions are true solutions but rather it is only necessary that the compounds be capable of being in a state of permanent and complete dispersion in the oil fraction.

The proportions of the additive materials which may be employed in the preparation of highly desirable anticorrosion compositions will generally be within the range of about 0.01% to about 10% by weight of the oil fraction for the total additive content and the preferable range for the total additive content will generally fall between about 0.05% and 3.0%. These percentage ranges are applicable to the ester alone in those instances in which the ester is the only anti-corrosion additive employed. It is to be pointed out that the amount of additive or additives will be dependent upon the mineral oil fraction employed and the use for which the resulting composition is intended. Thus in the case of turbine oils the total additive composition is desirably within the range of about 0.1% to 2.0% by weight of the mineral oil. In the case of Diesel engine fuels where contamination with sea water may occur, 0.02% to 3.0% of the additive may be required. However, for Diesel fuels in which contamination with sea water is not contemplated smaller amounts may be employed, such as, little as 0.01% to about 1.5%. On the other hand, in the case of cutting oils, wetting agents, and the like, as much as 10% by weight of the additives may be desirable.

In those compositions in which both esters and acids are employed as anti-corrosion agents, the proportion of ester will be between about 80% to about 99% of the total additive and the acid will constitute between about 1.0% and about 20.0% of the additive. Although these proportions may be varied beyond these limits in some instances where it may be desirable to use approximately equal proportions of acid and ester. Thus the percentage of ester in the two component additive compositions may vary between about 0.01% and about 9.9% by weight and preferably between about 0.48% and about 3.0% by weight and the percentage of acid will be between about 0.005% and about 5.0% by weight and preferably between about 0.025% and 1.5% by weight.

Although the invention has been described as relating to anti-corrosion compositions consisting primarily of mineral oil fractions containing small amounts of an ester or of an ester in conjunction with small amounts of organic acid, it is often desirable to employ two or more esters and/or acids in the preparation of desirable compositions. Thus, valuable anti-corrosion compositions may be prepared in accordance with the principles of the invention which contain two or more of the described esters above or two or more of the described esters with a single acid or with two or more acids. Similarly desirable compositions may be prepared using a single ester and two or more of the organic acids.

Many of the described esters are commercially available, however, those which are not may be readily prepared by any of the well known esterification processes which generally involve reacting the polyhydroxy alcohol with one of the desired organic acids in the presence of dehydrating agents, catalysts, and the like.

Although in general the compositions comprising mineral oil fraction and the above described anti-corrosion additives are relatively non-emulsifiable it is sometimes desirable to improve the emulsion characteristics of the finished product by adding thereto an agent which tends to further reduce the emulsification tendency of the oil. Thus we may add high molecular weight alcohols, such as octyl alcohol, decyl alcohol, myristal alcohol, and the like, in proportions in the order of about 0.1% to about 1.0% by weight of the finished hydrocarbon fraction. It is essential that the added alcohol be oil-soluble, as described herein, and preferably the alcohols will have boiling points at least as high as the boiling points of the hydrocarbon fraction to which they are added. It is well known that such alcohols added to hydrocarbon fractions tend to increase the corrosivity of the hydrocarbon fractions in the presence of water. However, when these alcohols are incorporated in hydrocarbon oils containing the above described esters, or containing the esters together with acids, the resulting compositions are entirely non-corrosive.

Furthermore, it is sometimes desirable to include anti-oxidants in the final composition. Anti-oxidants which have been found to be particularly desirable, in that they apparently do not alter the effectiveness of the described anti-corrosion agents nor do they increase emulsification tendencies, include particularly the alkyl substituted phenols. Preferably these substituted phenols will contain two or more alkyl substituents. Those having three alkyl substituents have been found to be specially effective as antioxadants. The alkyl groups may contain one or more carbon atoms. A compound which has been found to be particularly desirable is 2,6-ditertiary-butyl-4-methyl phenol. These anti-oxidants may be employed in amounts between about 0.1% and about 1.0% by weight of the total composition.

In the case of lighter mineral oil fractions, such as particularly Diesel engine fuel, emulsification problems are not as important and in their instances other types of materials may in some instances be employed with high molecular weight organic acids to produce desirable anti-corrosive compositions. Thus additives which may be used in conjunction with, or in place of, the above described esters include degras phosphatides, such as lecithin, hydroxy amides of fatty acids, such as diethanol oleic amide, butanol oleic amide, and the like. However, this group of additives is not to be considered equivalent to the described esters and they do not impart the characteristics of non-emulsifiability as do the esters.

In the case of cutting oils and extreme pressure lubricants, for example, where it is desirable to include in the composition sulfurized or chlorinated materials to impart the desirable extreme pressure characteristics, these materials may be added to a selected mineral oil fraction along with the described anti-corrosion additives to provide anti-corrosive compositions. Thus sulfurized fatty oils, such as sulfurized lard oil, chlorinated paraffin wax, chlorinated fatty oils, and the like, may be included in the composition.

The following examples are presented to show typical formulations which fall within the scope of our invention. However, the proportions of ingredients may be varied considerably depending upon the characteristics desired in the finished composition and without departing from the spirit of the invention.

Example I

A turbine oil having desirable anti-corrosion and non-emulsifying characteristics was prepared and tested for corrosivity and deemulsibility. This oil had the following composition:

| Material: | Per cent by weight |
|---|---|
| Mineral oil [1] | 99.52 |
| Glycerol monooleate | 0.30 |
| Diethyleneglycol monolaurate | 0.15 |
| Sulfurized oleic acid [2] | 0.03 |

[1] SAE 20 grade solvent treated Western lubricating oil having a viscosity index of 38.
[2] Oleic acid with 5% sulfur heated to 300° F. for 3 hours until non-corrosive to copper.

The above oil was found to pass both the corrosion and emulsion tests specified by the Bureau of Ships, ad interim, Specification 14-O-15 (INT), May 1945. The corrosion test was run in the manner described in the ASTM Test for Rust-preventing Characteristics of Steam Turbine Oil in the Presence of Water, ASTM Designation D665-44T, except that a synthetically prepared sea water was used in place of the distilled water described in the ASTM test procedure. In this test, a polished cylindrical steel specimen is placed in a beaker containing the oil to be tested to which has been added 10% by volume of synthetic sea water and the oil is maintained at a temperature of 140° F. for a period of forty-eight hours. During the period of test the mixture is vigorously agitated by means of a stirrer. In order to pass the test there must be no visible rust on the steel test specimen.

The emulsion test is described in the Federal Standard Stock Catalog, section IV (part 5), Federal Specification for Lubricants and Liquid Fuels, VV-L-791, page 76. In this test 40 ml. of emulsifying liquid (distilled water and 1% salt solution) is placed in a 100 ml. graduated cylinder and 40 ml. of oil to be tested is then added. The cylinder is heated in a bath to 130° F. and the liquid contents are stirred by means of a paddle for 5 minutes at a speed of 1500 R. P. M. The stirrer is removed and the cylinder allowed to stand at 130° F. for 30 minutes. At the end of this period no continuous layer of emulsion shall remain.

Example II

A second turbine oil was prepared according to the formula given in Example I, except that sulfurized oleic acid was replaced by oleic acid. This oil satisfactorily passed both the corrosion and emulsion tests.

Example III

Naphthenic acid may be substituted for sulfurized oleic acid in Example I to give a highly satisfactory, non-corrosive, non-emulsifying turbine oil.

Example IV

A turbine oil was prepared having the following composition:

| Material: | Percent by weight |
|---|---|
| Mineral oil [1] | 95.003 |
| Glycerol monooleate | 0.2 |
| Oleic acid | 0.04 |
| 2,6-ditertiary-butyl-4-methyl phenol | 0.25 |
| Lead naphthanate | 0.007 |

[1] SAE 20 grade solvent treated Western lubricating oil having a viscosity index of 38.

The above oil passed the ASTM D665-44T Corrosion Test (distilled water) and the emulsion test described in Example I.

Example V

A turbine oil was prepared having the following composition:

| Material: | Percent by weight |
|---|---|
| Mineral oil [1] | 95.5 |
| Diethylene glycol monolaurate | 0.2 |
| 2,6-ditertiary-butyl-4-methyl phenol | 0.25 |

[1] SAE 20 grade solvent treated Western lubricating oil having a viscosity index of 38.

This oil passed the ASTM Corrosion Test D665-44T with distilled water.

Example VI

A Diesel engine fuel of the following composition was prepared:

| Material: | Percent by weight |
|---|---|
| Diesel engine fuel (50 cetane) | 99.76 |
| Glycerol monooleate | 0.15 |
| Diethyleneglycol monolaurate | 0.075 |
| Sulfurized oleic acid | 0.015 |

The corrosivity of this Diesel fuel was tested using the above mentioned Bureau of Ships Corrosion Test in which the amount of synthetic sea water was reduced from 10% to 3% by volume. This oil prevented rusting of the steel specimen.

The above composition contaminated with 1% of sea water has been successfully used as a fuel for Diesel engines.

The above description of our invention is not to be taken as limiting but only illustrative as many variations may be made by those skilled in the art coming within the scope of the following claims.

We claim:

1. A Diesel engine fuel having anti-corrosion characteristics capable of preventing corrosion of metal parts in the fuel system of said Diesel engine caused by contamination of said fuel with saline water, consisting essentially of Diesel engine fuel containing between about 0.02% and about 3.0% by weight of an anti-corrosion additive, said additive containing between about 80% and about 99% by weight of a fatty acid ester of a polyhydric alcohol selected from the group consisting of glycerol and glycols, the ester containing at least one unesterified hydroxy group, and between about 1.0% and about 20% by weight of a fatty acid; the acid residue of said fatty acid ester and of said fatty acid each having at least about 10 carbon atoms per molecule, said composition being substantially free from metal soap.

2. A Diesel engine fuel having anti-corrosion characteristics capable of preventing corrosion of metal parts in the fuel system of said Diesel engine caused by contamination of said fuel with saline water, consisting essentially of Diesel engine fuel containing between about 0.02% and about 3.0% by weight of an anti-corrosion additive, said additive containing between about 80% and about 99% by weight of an acid ester of a polyhydric alcohol selected from the group consisting of glycerol and glycols, the ester containing at least one unesterified hydroxy group, and between about 1.0% and about 20% by weight of an acid, the acid residue of said acid ester and the said acid each having at least about 10 carbon atoms per molecule and being selected from the group consisting of fatty acids, naphthenic acids and oil soluble acids produced by the oxidation of petroleum fractions, said composition being substantially free from metal soap.

3. A Diesel engine fuel according to claim 1 in which said ester is an ester of diethylene glycol.

4. A Diesel engine fuel according to claim 1 in which said free fatty acid is sulfurized oleic acid.

5. A Diesel engine fuel according to claim 1 in which said ester is an ester of glycerol.

6. A Diesel engine fuel having anticorrosion characteristics consisting essentially of Diesel engine fuel containing between about 0.02% to about 3.0% by weight of an anti-corrosion additive, said anti-corrosion additive containing between about 80% and about 99% by weight of a polyhydroxy alcohol monoester of a fatty acid the polyhydroxy alcohol being selected from the group consisting of glycerol and glycols and between about 1.0% and about 20.0% of a fatty acid, said fatty acid and the acid residue of said ester each containing at least about 12 carbon atoms.

7. A Diesel engine fuel having anti-corrosion characteristics capable of preventing corrosion of metal parts in the fuel system of said Diesel engine caused by contamination of said fuel with sea water, consisting essentially of Diesel engine fuel containing about 0.15% glycerol monooleate, about 0.075% diethylene glycol monolaurate and about 0.015% sulfurized oleic acid, said Diesel engine fuel being substantially free from metal soap.

8. A Diesel engine fuel according to claim 2 wherein the acid residue of said acid ester is a naphthenic acid residue.

9. A Diesel engine fuel according to claim 2 wherein said acid is naphthenic acid.

CHARLES C. MOORE.
PAUL W. FISCHER.

REFERENCES CITED

The following references are of record in the file of this patent:

UNITED STATES PATENTS

| Number | Name | Date |
|---|---|---|
| 2,172,285 | Lincoln | Sept. 5, 1939 |
| 2,198,851 | Wiezevich | Apr. 30, 1940 |
| 2,261,888 | Rocchini | Nov. 4, 1941 |
| 2,281,676 | Cook | May 5, 1942 |
| 2,301,918 | Morgan | Nov. 17, 1942 |
| 2,388,083 | Reswick | Oct. 30, 1945 |
| 2,412,634 | Schwartz | Dec. 17, 1946 |
| 2,434,490 | Duncan | Jan. 13, 1948 |